April 14, 1931.   O. C. WILSON   1,801,215
CAM CONSTRUCTION
Filed June 29, 1927

INVENTOR
O. C. WILSON
BY Munn & Co.
ATTORNEYS

Patented Apr. 14, 1931

1,801,215

UNITED STATES PATENT OFFICE

OSCAR C. WILSON, OF ERLANGER, NORTH CAROLINA, ASSIGNOR OF ONE-HALF TO C. W. LEISTER, OF ERLANGER, NORTH CAROLINA

CAM CONSTRUCTION

Application filed June 29, 1927. Serial No. 202,330.

This invention relates to cam construction and it is my aim to provide a sectional cam having adequately strengthened wearing or contact portions and constructed and arranged for easily effected mounting on its shaft without the use of keys or set screws.

In providing a construction of cam, to attain these ends, I have utilized the wedging principle and have provided means for locking the sectional cam on its shaft and for locking the sections of the cam together. Two series of coordinated wedging surfaces are utilized to effect these results, one series having relative wedging movement in a direction to draw and lock the sections together, and the other series having relative wedging movement substantially at right angles thereto, to clamp the cam sections on the shaft. In other words, the sections of the cam having interlocking wedging engagements between themselves as sections, and with their cam shaft, the engagements being effected substantially coincidently and the relative movements into such wedging engagements being in lines at approximate right angles to each other.

The cam sections, obviously, provide cooperating hub portions and have cooperating wedging surfaces formed on the hub portions. As a substantial contribution to the security of the grip of the cam on the cam shaft, the interwedging surfaces when joined and cooperating to effect this grip, are located approximately in the plane of the perimeter of the cam.

Those portions of the perimeter performing the actual camming functions and subjected both to abrasion and strain are reinforced by a laterally enlarged edge flange curved inwardly to join the main body of the cam. This lateral strengthening enlargement of the cam perimeter at the point of strain lies in the plane of the wedging interlocking surfaces previously described, so that force exerted against the cam perimeter by its cam action tends, in practical use, to maintain the interlocking engagement and is not directed in a plane tending to impart endwise separating movement to the cam sections.

An important factor in facilitating the application of the cam to its shaft at any point and without removing the shaft from its bearings consists in the provision of a main body, centrally recessed to provide a fixed half hub section and having a shaft embracing radial slot of substantially greater width than the diameter of the shaft extending inwardly from the peripheral edge of the cam and a removable section having a cooperating half hub section and peripheral portion seating in said slotted portion, the two hub sections having the cooperating wedging surfaces previously referred to. With the described construction, the main body portion of the cam, easily seats over the cam shaft at any point and the smaller removable section is seated over the shaft through the slot and the two then drawn together into wedging interlocking engagement by draw-bolts.

These and other features of construction are described in more detail in the following specification of parts which is to be read in conjunction with the accompanying drawing forming part thereof and in which one embodiment of the invention is shown.

In this drawing:—

Figure 1:
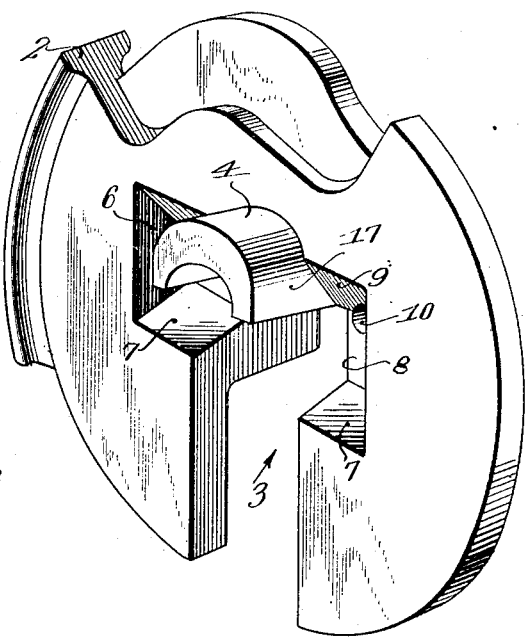
Figures 1 and 2 are perspective views of the two sections of the cam associated in their relative positions of assembly.

For the purposes of illustration, I have selected a pick cam such as is commonly used in looms, although so far as the purpose of the present invention is concerned, the particular purpose and shape of the cam is immaterial. The main body of the cam 1 which is generally eccentric in shape and has that portion of its perimeter performing the actual camming functions herein designated at 2, reinforced by lateral enlargements forming edge flanges which curve back into the main body of the cam and, as will be seen later, are substantially in the plane of the coordinated wedging surfaces by means of which the two sections of the cam are interlocked to each other and to the cam shaft embraced thereby. The main body 2 of the cam, as best seen in Figure 1 is in the form of a disk provided with a substantially radial slot 3 extending inwardly from its edge toward and beyond the center of the disk, the slot extending substantially half through a rear hub portion 5 (Figure 4) formed integrally with the disk to receive the half hub portion 12 of a removable section of the cam, a complemental half hub portion 4 being formed on the main cam body or disk and projecting laterally therefrom at the side opposite the hub portion 5. The face of the disk at the side opposite to the hub portion 5 is provided centrally and at opposite sides of the slot 3 and hub section 4 with substantially rectangular recesses 6 extending axially of the disk and partly through its hub portion, terminating at the rear in vertical walls 8 (Fig. 1). The opposite outer side walls 6 of these recesses extend in the vertical. The bottom or lower walls 7 of the recesses taper upwardly to the back walls 8 and form wedging surfaces. The top or upper walls 9 converge downwardly and act as abutments or stops for cooperating surfaces on the removal cam section. The rear walls 8 of the recesses are provided with bolt-receiving bores 10.

Figure 2:
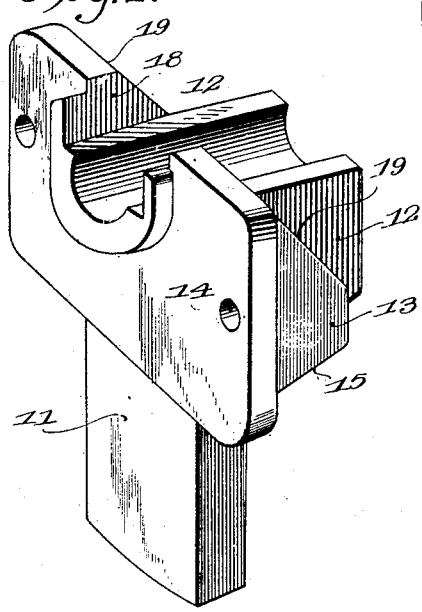
Figure 3:
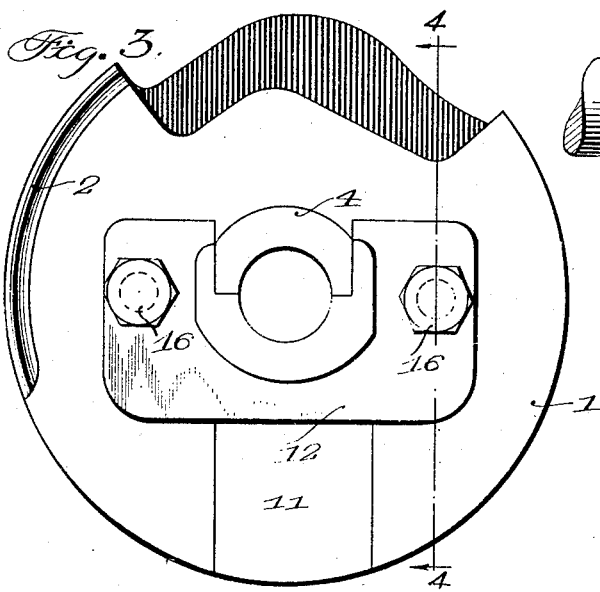
Figure 3 is a front elevation of one end of the cam, assembled.

The cooperating cam section which seats within the recessed face and slot of the main cam body or disk comprises the radial plate-like portion 11 seating within the slot 3 at and inwardly of the periphery of the cam, and a central shaft embracing half hub section 12 complemental to the half hub section 5 and insertible axially through the upper or disk center end of the slot 3. At opposite sides of the hub section 12 are wedge-shaped wings or blocks 13 alining with the recesses 6, and provided with bores 14 therethrough alining with the bores 10 in the rear walls 8 of the recesses. As shown in Figs. 2 and 3, the outer ends of these blocks or wings are joined by a face plate whose edges overlie the edges of the recesses 6, the bores 14 extending through this plate.

Figure 4:
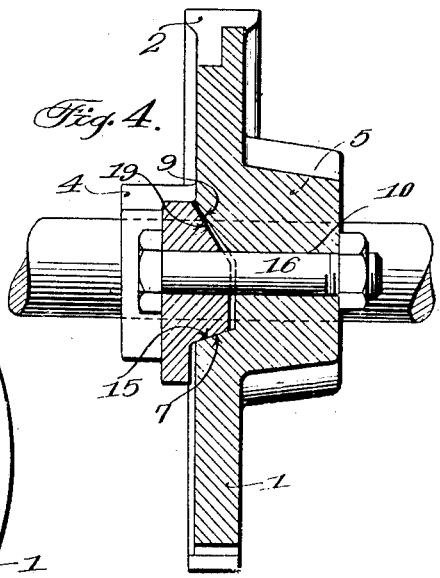
Figure 4 is a vertical section on the line 4—4 of Figure 3.

Each of the two sections of the cam have pairs of coordinated wedging surfaces engageable substantially coincidently by relative axial joining movement of the sections, when, for example, the section 11 is inserted in the main section 1. One series or pair of cooperating complemental pairs of wedging surfaces are effective to bind the two sections together by wedging movement in one direction and a second series of complemental pairs of wedging surfaces are effective to cause wedging movement in another direction at substantially right angles to the first, which movement is effective to bind the two half hub sections 4 and 12 on an inclosed shaft. The cooperating wedging surfaces which are effective to cause this last action are provided by the tapered underfaces 15 of the wedging blocks 13 which ride up upon the inclined wedging surfaces 7 when the two sections of the cam are drawn together by means of the draw-bolts 16 inserted through the alined apertures 14, 10 and operated to draw the sections together as seen in Figure 4. The section interlocking wedging surfaces are provided by inwardly tapering sides 17 at the outer face of the upper half hub carried by the main section 1 of the cam with which the correspondingly tapered overlapping inner side faces 18 of the wedging blocks 13 of the center or hub portion cooperate, the thrust effected through engagement of these wedging surfaces being in a line at approximately right angles to the upward thrust caused by engagement of the cam surface 15, 7 to bind the cam on the shaft. It will be noted from Figure 4 that the cooperating wedging surfaces are positioned approximately in the plane of the operative strain receiving perimeter of the cam, so that force applied thereagainst in the actual use of the cam does not exert thrust in a direction tending to disengage the interwedged surfaces.

Obviously, there is a slight differential in the taper of the cooperating wedging surfaces in order that there may be wedging engagement. The downwardly tapering upper wall or ceiling 9 of the recess in the main body 1 of the cam and the corresponding tapered downwardly extending top 19 of the wedging block 13 coact when the cam sections are drawn together by the draw-bolt 16 and act as abutments limiting the wedging movement to the safety factor. Incidentally, it is an added advantage that the tapering surface 19 may be cut down by filing or otherwise in originally fitting the cam to the shaft, the position of the wedging block on the cam section making this operation an easy one. The sections of the cam are so formed that they may be molded of castiron and require only slight machining. The reinforced operating face 2 of the cam is readily formed in this operation as an integral part of the perimeter and the advantage of a reinforcing wear-resisting cam face thereby secured in the casting of the cam and at extremely slight additional expense.

While I have exemplified my invention by reference to a specific embodiment thereof and to a detailed description, it will be obvious that my invention provides certain combinations and arrangements of parts which are, in themselves, novel and which, while within the spirit of my invention and the scope of the appended claim, may appear in embodiments specifically different from the particular form illustrated herein. I do not desire therefore to be limited to the specific embodiment disclosed herein except as may be necessary due to the state of the prior art or the scope of the appended claim.

I claim:

A two part cam comprising a main body portion formed by a cam disk having a radial shaft insertion slot therein extending inwardly from its peripheral edge to beyond its center, with an integral half hub portion at its inner end extending axially from the face of the cam disk and provided with opposite outer side faces tapered for wedging engagement and with the face of the cam disk at opposite sides of said hub and bordering said slot formed with recesses therein having base walls opposed to said hub portion and tapering inwardly longitudinally of the hub axis and inwardly toward the center of said cam disk, and a complemental cam section having a radial filler portion for said radial disk slot, an integral half hub portion complemental to the disk half hub portion and provided at opposite sides with wings alining with said rectangular recesses of the disk and having tapered bottom surfaces wedgingly cooperating with the tapered base walls of said recesses on relative axial assembling movement of the cam sections to force its half hub portion toward the disk hub portion and into clamping engagement with a shaft enclosed therebetween, the inner side faces of said wings being tapered wedgingly to cooperate with the tapered opposite outer side faces of the hub portion of the disk to interlock the cam sections together coincidently with wedging movement of the hub portions to clamp a shaft therebetween.

OSCAR C. WILSON.